Oct. 9, 1956  G. RADICH  2,765,898
CONVEYOR APPARATUS FOR CONTAINERS
Filed July 14, 1953  2 Sheets-Sheet 1

Inventor:
George Radich
By Oswald H. Milmore
His Attorney

Oct. 9, 1956

G. RADICH 2,765,898

CONVEYOR APPARATUS FOR CONTAINERS

Filed July 14, 1953

Inventor:
George Radich
By Oswald R. Milmore
His Attorney

United States Patent Office 2,765,898
Patented Oct. 9, 1956

2,765,898

CONVEYOR APPARATUS FOR CONTAINERS

George Radich, Sewaren, N. J., assignor to Shell Development Company, Emeryville, Calif., a corporation of Delaware Application July 14, 1953, Serial No. 367,961

16 Claims. (Cl. 198—32)

This invention relates to conveyor apparatus for handling containers, such as cans. It is particularly, although not exclusively, adapted for handling empty cylindrical cans that are supplied continuously or intermittently from a plurality of sources and delivering them as a single stream of cans.

In plants wherein large quantities of cans are received, it is common practice to ship them in bulk in railroad box cars that are spotted along a warehouse platform and from which cars they are unloaded into can conveyors having entrance termini disposed at convenient locations near or within the box cars and leading thence to the point of utilization, such as a can-filling machine, to which the cans are supplied, i. e., as a single file. The conveyors are often of such length as to store a considerable number of cans to permit the filling machine to be fed continuously while the box cars are unloaded intermittently. To permit several box cars at different locations to be unloaded, it is known to provide merging switching devices for feeding two or more supply conveyors into a common discharge conveyor. Such merging devices have not, however, been entirely suitable in that devices of simple construction were not suited for continuously receiving streams of cans simultaneously from more than one source; instead, they were switched to receive cans from one source for a period of time and then switched to receive cans from another source. This made it impracticable to unload more than one box car simultaneously unless very long tributory conveyors were provided, long enough to store up a quantity of cans while the switching device was set to receive cans from the other conveyor.

It is an object of this invention to provide an improved can conveying system wherein a container from a plurality of sources can be received simultaneously by a single receiving conveyor, whereby the tributory conveyors can be made short.

A further object is to provide an improved and simple merging device for merging two or more streams of containers supplied by separate supply conveyors in single files into a single file of containers on a discharge conveyor.

Further objects are to provide certain specific improvements in the merging device whereby jams due to too rapid supply of containers to the merging device is automatically prevented; whereby containers are supplied smoothly to the merging device for movement therein along different paths; whereby the containers are fed onto the merging device from a tributory conveyor with decreased tendency to tilt; and wherein the discharge conveyor is provided with means for impeding the free discharge of containers under certain conditions in a manner to insure the discharge thereof in an upright position.

In summary, according to the invention the system comprises a main, preferably power driven, conveyor that is interrupted at intervals by merging devices each of which includes a rotatably mounted horizontal disc having a peripheral rail and disposed to receive containers from an upstream part of the said conveyor at one side and to discharge containers on another side into the downstream part of said conveyor, each disc having an auxiliary or tributory conveyor for feeding an additional stream of containers onto the disc, the tributory conveyors being supplied from sources that may, for example, be situated at different points along the course of the main conveyor. The merging device is advantageously constructed to embody the other specific features of the invention, and which may be employed in merging devices installed in a different environment; these features include: a sensing member engageable by containers on the disc for movement in the event of an incipient or developed jam, in combination with a brake on one of the supply conveyors, preferably the power driven main conveyor, for impeding, i. e., slowing down or entirely stopping, the supply of additional containers from that conveyor; a take-off deflector at the inlet to the discharge conveyor for deflecting containers into the conveyor as they are carried about with the disc; and a brake at the inlet to the discharge container to retain a container there for engagement by a subsequent container, whereby to prevent tilting of the latter.

The invention will be described in detail with reference to the accompanying drawing showing one specific embodiment by way of illustration, wherein.

Figure 2:
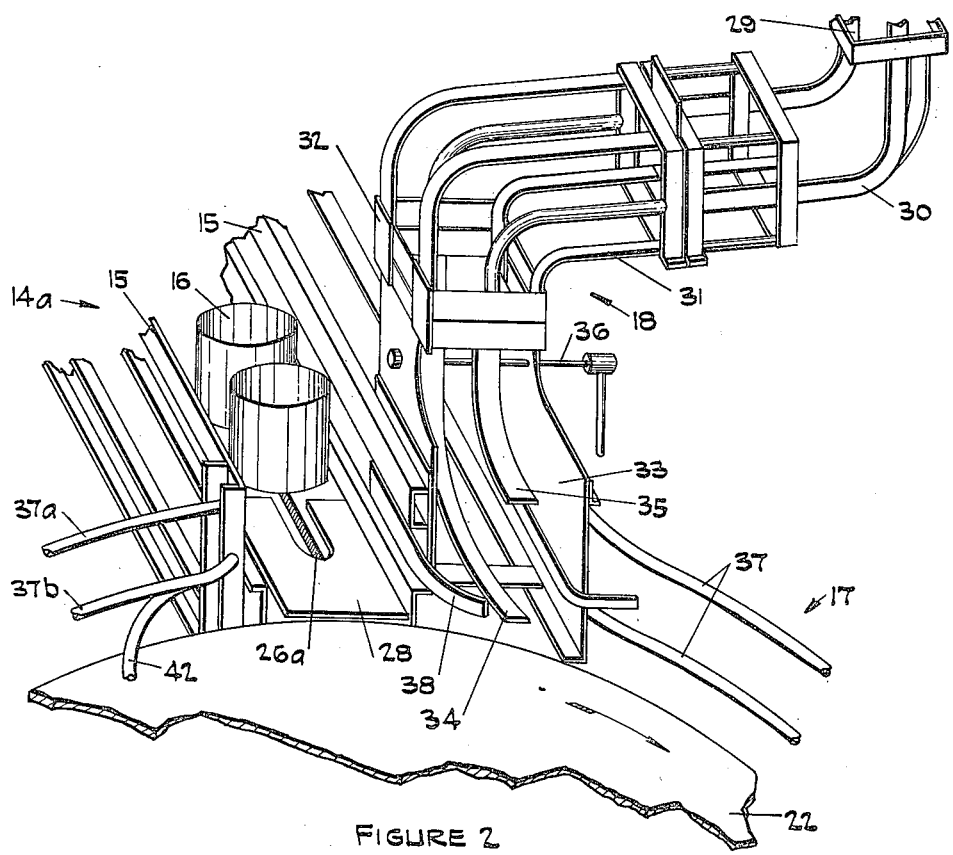
Figure 2 is a perspective view of a portion of the merging device showing the supply conveyors.
Figure 1:
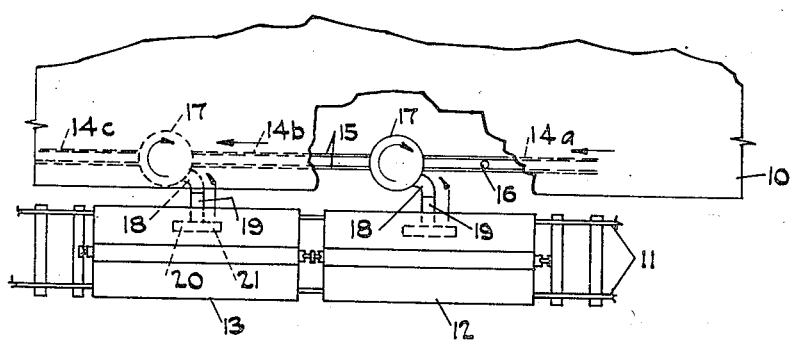
Figure 1 is a diagrammatic plan view of the conveying system.

Referring to Figure 1, 10 represents a loading platform alongside of and at a level above railroad tracks 11 on which are box cars 12, 13. Beneath the platform is a main conveyor comprising sections 14a, 14b and 14c, having lateral guide rails 15 for retaining cans 16 in upright position. Each section of the main conveyor is provided with a power-driven propulsion element, such as a cable as described hereinafter, for moving the cans in the arrow direction. A plurality of merging devices 17 are provided at intervals along the main conveyor, e. g., spaced at intervals corresponding to the normal length of a railroad box car, and tributory conveyors 18 extend upwards from these devices to above the platform level. Extensions 19 may be slid onto the upper ends of the tributory conveyors to extend at an upward incline into the box car for receiving cans from tracks 20 and 21; such extensions and tracks are known per se and need not be further described. Empty cans placed onto the tracks 20 and 21 move by gravity in single file down the extensions 19 and tributory conveyors 18 onto the merging devices 17.

One of the merging devices is shown in detail in Figures 2–5. It includes: a horizontal disc 22 mounted for rotation about a vertical axis by a spindle 23 journalled in thrust and radial bearings 24 and having a pulley 25 adapted for driving engagement with an endless cable 26 that is driven continuously by a power drive, not shown, to turn the disc in the arrow direction. The disc has two supply conveyors of which the first is the section 14a of the main conveyor that is upstream with respect to the merging device and the other is the tributory conveyor 18; it has, further, a discharge conveyor, constituted by the section 14b of the main conveyor.

The conveyor sections 14a and 14b each have lateral guide rails 15 spaced apart to retain cylindrical cans 16 in upright position and in single file. A common drive cable 26a is positioned at the central, lower part of each conveyor by means of idlers of which only the idler 27 appears in the drawings. The cans rest on the cable and hence move with it but because the only effective frictional force between the cans and the cable is caused by the weights of the cans slippage is possible in the event that a can is held back, as by the brake to be described. The drive cable 26a may be the return portion of the cable 26. It will be noted that the conveyor sections 14a and 14b are in alignment along an axis that is offset from the axis of rotation of the disc, and that the disc is higher than the cable, whereby the latter may extend to one side of the spindle 23 and beneath the disc. An inclined ramp 28 is provided at the exit end of the supply conveyor 14a to cause the cans to rise at least to the level of the top of the disc, and has a central notch as shown to accommodate the cable. It is evident that the cans on the ramp are pushed forwardly by subsequent cans that are moved by the cable.

The tributory conveyor 18 includes a vertical portion 29 that extends from a height above the platform 10 to the underside thereof and has guide rails for retaining a stack of descending cans on their sides with their axes horizontal and substantially parallel to the axis of the main conveyor. The vertical portion 29 is connected to feed the cans successively into a curved section 30, an inclined section 31, a second curved section 32 and a curved uprighting section 33; the last includes lower and upper arcuate guides 34 and 35, spaced apart by a distance equal to slightly more than the height of a can and terminating close to the periphery of the disc so as to feed cans onto the disc. It will be understood that the cans move with translatory motion through sections 29—32, and are swung through a right angle in the uprighting section 33 so as to enter the disc 22 in upright position. A gate (not shown) may be mounted on a rotatable shaft 36 for stopping the supply of cans through the tributory conveyor.

The merging device has stationary arcuate peripheral guide rails 37, 37a disposed over the marginal portions of the disc and interrupted at the conveyors, to a suitable height for retaining cans on the disc 22 against centrifugal force. A deflector 38 is suitably mounted, e. g., on the rails 15 of the conveyor section 14a, between the latter and the tributory conveyor and extends inwardly over the disc. It may be made of resilient sheet metal and is curved in the direction of rotation of the disc so as to leave between itself and the rail 37 a clearance just wide enough for a single can to pass. It is evident that cans admitted from the conveyor 14a, which is ahead of the tributory conveyor and deflector, reckoned with respect to the direction of rotation of the disc, will be deflected radially inwardly by the deflector so as to be carried by the rotating disc substantially along an arc that is radially inside of the arc of containers supplied by the tributory conveyor, the latter being immediately adjacent the rail 37. It is desirable to make the deflector resilient so that it can yield to the force of cans carried around by the disc for preventing jams. The deflector 38 reduces the tendency of the cans on the disc 22 to tilt, which would otherwise result if cans leaving the tributory conveyor 18 at an appreciable speed were allowed to come into contact with cans on the disc.

Figure 5:
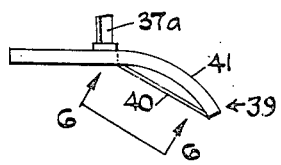
Figure 5 is an enlarged plan view of the take-off guide.
Figure 6:
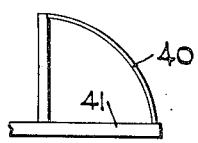
Figure 6 is an elevation view of the take-off guide taken on line 6—6 of Figure 5.

A take-off guide 39, shown in detail in Figures 5 and 6, extends inwardly over the disc from the far side of the discharge conveyor 14b, reckoned with respect to the direction of rotation of the disc, to deflect cans that move in engagement with the rail 37 in single file outwardly into the conveyor. This guide is advantageously shaped with the upper margin thereof curved against the direction of rotation of the disc and inclined downwardly toward the radially inner part thereof, so that cans will come into engagement with guide first at the lower parts thereof.

This construction is achieved by forming the guide of an arcuate rod 40, the radially inner end thereof being braced by a horizontal arcuate rod 41 that extends to the radially outer part of the guide.

An arm 42 is pivotally mounted on a vertical pivot axis at 43 and has an arcuate part that extends over the disc at a height to be engaged by cans thereon. It is urged toward the solid line position by a tension spring 44 that is connected to a suitable abutment, may be moved outwardly, away from the axis of rotation of the disc, to the dotted line position by centrifugal forces of cans on the disc, whereby it functions as a sensing member. The spring 44 is preferably of such stiffness that a small number of cans will not move the arm to its outer position, but a larger number, e. g., sufficient to engage points along the major part of the arm, will cause such movement. The end of the arm away from the arcuate part constitutes a laterally movable brake situated at one side of the supply conveyor 14a between the rails 15 thereof; it may be lined with suitable brake lining 45 to engage the cans and impede, i. e., retard or stop their movement, without scuffing the finish. The arcuate part of the arm is shaped to project outwardly between the guide rails 37a at the side of the disc near the discharge conveyor and to make a large obtuse angle with these rails so that the cans will be carried along the arm without obstruction; the part of the rails 37a behind the arm hence do not engage the cans and are provided only to mount the rails. The part 46 of the arm 42 immediately ahead of the conveyor 14a is situated radially inwardly from the rail by a distance preferably at least as far as the diameter of one can or somewhat farther, as shown, so that cans carried by the disc along the arm will move radially inwards and be thence carried from the arm substantially along an arc situated radially inwardly from fresh containers received from the supply conveyor 14a. Optionally, an auxiliary peripheral guide rail 37b that is inclined inwardly toward the axis of rotation of the disc in the direction of rotation thereof is provided for deflecting the cans radially inwardly while moving clockwise; as is evident from Figure 3, this guide functions only when the sensing arm 42 is in its outer, dotted line position. The part 46 of the arm 42 and the guide 37b, therefore, perform similar functions.

A discharge brake 47 is mounted on one side of the discharge conveyor 14b at the entry end thereof for retarding the passage of cans. This brake may be made of a plate of metal hinged at 48 and provided with a push rod 49 adapted for abutment with a bolt 50 carried by outer end of the arm 42 and axially adjustable thereon by means of nuts as shown. When the arm 42 is in its normal, inner position, the bolt 50 urges the rod 49 and brake 47 inwardly to actuate the brake with a light pressure that is insufficient to prevent the passage of cans when driven by the combined actions of the cable 26a and the force of cans carried into the take-off guide 39 by the disc 22. This pressure can be varied by adjusting the bolt 50. However, when the rate at which cans are supplied by the disc 22 to the take-off guide is so slow that cans move intermittently, the latter driving force is interrupted during such times as no cans are being taken off and the brake is effective to hold a can; this results in a file of several cans being retained between the brake and the take-off guide. The purpose of this brake is to insure that there is always a can at the entrance to the discharge conveyor, immediately adjoining the take-off guide, so that the next can entering the conveyor is steadied against tilting along the entire height thereof. In this way cans are caused to enter the conveyor in upright position. When the arm 42 moves outwardly the bolt 50 moves away from the push rod 49 and the brake is free to swing outwardly, such swinging movement being brought about by the force of cans tending to move through the conveyor. It will be seen that this release of the brake 47 is useful in insuring against an erroneous tensioning of the spring 44, since too strong a braking action could prevent entirely the passage of cans. Such cessation of discharge would cause the sensing arm 42 to swing out to release the brake and prevent a jam on the disc. It is evident that when the disc 22 is well supplied with cans the brake 47 is not needed, since the cans being discharged in single file will naturally be in contact with each other and have no tendency to be upset.

Figure 3:
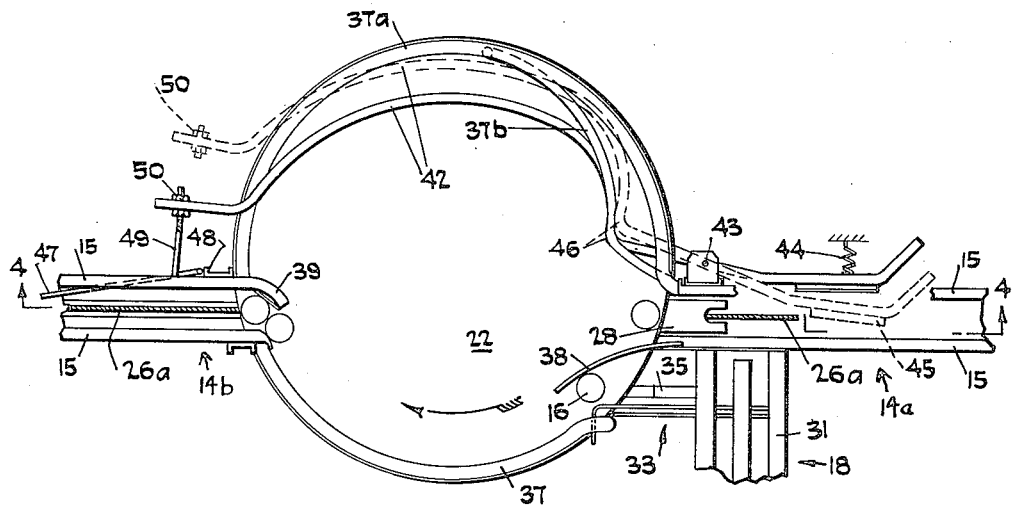
Figure 3 is a plan view of the merging device and portions of the conveyors.
Figure 4:
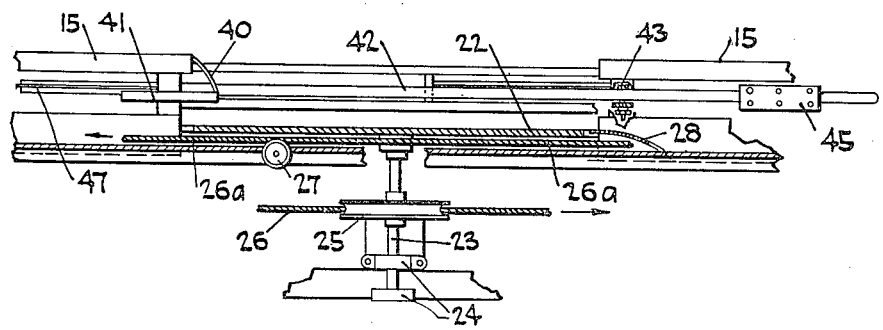
Figure 4 is a longitudinal sectional view taken on the vertical plane indicated by the line 4—4 of Figure 3.

In operation, cans unloaded at each of the several box cars 12, 13, into the tributory conveyors 18 move by gravity in single file and upright position onto the continuously rotating discs 22 of the respective merging devices 17. Cans in main conveyors 14a, 14b, 14c move by the power-driven cable 26a in single file and pass successively through the merging devices 17, entering onto each disc 22 in upright position from conveyor 14a in the case of Figures 2–4, and being deflected radially inwardly with respect to the cans from the tributory conveyors by the deflector 38. This deflector deflects cans entering from the tributory conveyor 18 radially outwardly to avoid upsetting cans already on the disc. The cans tend to move toward the guide rail 37 by centrifugal force and are taken off in single file by the take-off guide 39 for entry into the discharge conveyor, i. e., into a downstream part 14b of the main conveyor as shown in Figures 3 and 4. When the rate of supply of cans is temporarily too great to be handled by the discharge conveyor, they form several arcs of cans, all cans except those in the outermost arc being carried circumferentially beyond the take-off deflector. When a considerable number of cans are carried around they press against the sensing arm 42, moving the latter pivotally against the force of the spring 44 to operate the brake 45 and impede or stop the entry of cans from the power driven, main conveyor, until such time as the number of cans on the disc has been diminished to permit the arm 42 to return to the inner, solid line position. The discharge brake 47 retards but does not prevent the movement of cans through the discharge conveyor, and serves to maintain always a few cans near the entry of this conveyor for preventing upsetting of cans due to sudden changes in forward speed during entry. When the arm 42 is moved to the dotted line position this brake is released to permit unimpeded travel of the cans.

The shape of the arcuate rod 40 and its relation to the rod 41 as shown in the drawings prevent tilted cans from becoming firmly engaged with the deflector. If this were not avoided, the tilted cans would block the entrance to the discharge conveyor. In addition, the said shape often serves to right tilted cans when they are travelling on the outer periphery of the disc.

I claim as my invention:

1. A conveyor system for feeding containers continuously from a plurality of sources into a single file comprising: a main conveyor for said containers having lateral guides spaced to maintain said containers in a single file; a plurality of merging devices interposed at intervals in said conveyor, each merging device comprising a horizontal disc mounted for rotation and positioned to receive containers from the part of said conveyor upstream with respect to the merging device and discharge said containers in single file into the downstream part of the conveyor; and a tributory conveyor at each said merging device disposed to feed containers onto the disc thereof, said merging device having a region above the disc that is positioned to receive containers both from said upstream part of the main conveyor and from said tributory conveyor and is radially unobstructed for a distance at least twice the spacing between said guides for simultaneously transporting containers in contact with one another at different radial positions on the disc.

2. A conveyor system according to claim 1 wherein the parts of said main conveyor that are immediately upstream and downstream, respectively, to the merging device are substantially at the level of the disc and said tributory conveyor extends upwardly from the disc for feeding containers from an elevated source onto the disc.

3. A conveyor system for feeding containers continuously from a plurality of sources into a single file comprising: a main conveyor for said containers having lateral guides spaced to maintain said containers in a single file; a plurality of merging devices interposed at intervals in said conveyor, each merging device comprising a horizontal disc mounted for rotation and positioned so that the parts of said conveyor that are immediately upstream and downstream, respectively, to the merging device are situated substantially at opposite sides of the disc to feed containers onto the disc and to receive containers in a single file from the disc, respectively; a tributory conveyor at each of said merging devices disposed to feed containers onto the disc near the periphery thereof at a point that is circumferentially displaced from the said upstream part of the conveyor; and a deflector over the disc disposed between said upper part of the main conveyor and the said tributory conveyor to guide containers that are fed onto the disc circumferentially ahead of the deflector, reckoned with respect to the direction of rotation of the disc, to a radially inner part of the disc and to guide containers that are fed onto the disc circumferentially behind the deflector to a radially outer part of the disc.

4. A conveyor system according to claim 3 wherein said tributory conveyor is situated circumferentially behind the said upstream part of the main conveyor.

5. A conveyor system for feeding containers continuously from a plurality of sources into a single file comprising: a main conveyor for said containers having lateral guides spaced to maintain said containers in a single file; a plurality of merging devices interposed at intervals in said conveyor, each merging device comprising a horizontal disc mounted for rotation and positioned to receive containers from the part of said conveyor upstream with respect to the merging device and discharge said containers in a single file into the downstream part of the conveyor; a tributory conveyor at each said merging device disposed to feed containers onto the disc thereof; a brake on said main conveyor situated upstream from a merging device for impeding the flow of containers therefrom onto the disc of said merging device; and an actuator for said brake including a sensing member situated over the said disc so as to be engaged by containers thereon, said sensing member being mounted and connected to operate said brake when moved outwardly by engagement with said containers.

6. Apparatus for merging two streams of containers to form a single stream of containers comprising: a horizontal disc mounted for rotary movement about the vertical axis; a plurality of supply conveyors disposed for feeding the respective streams of containers onto the disc; a discharge conveyor disposed for receiving containers as a single stream from a radially outer part of said disc; an arcuate peripheral guide disposed to retain containers on the disc between said conveyors; a brake for at least one of said supply conveyors adapted when operated to impede the admission of containers to the disc; and a brake actuator including a sensing member situated over the disc to be engaged by containers thereon and movable outwardly from said axis by the force of said containers, means yieldably urging said sensing member inwardly, and a connection for operating said brake upon an outward movement of the sensing member.

7. Apparatus according to claim 6 wherein said sensing member is a pivoted arm having an arcuate outline and extending over a portion of the periphery of the disc so as to constitute a guide.

8. Apparatus according to claim 7 wherein said arm is situated circumferentially ahead of the point at which said one supply conveyor feeds containers onto the disc reckoned with respect to the direction of rotation of the disc, and at least a part of said arm is situated radially inwardly from said point, whereby containers on said disc that are carried by the disc away from the arm will move substantially along an arc situated radially inwardly from containers received from the said supply conveyor.

9. In a container-handling apparatus comprising a horizontal disc mounted for rotation on a vertical axis and adapted to support cylindrical containers in upright position and a conveyor having the intake thereof positioned to receive said containers in upright position from a peripheral portion of said disc and having lateral guides and power-driven means extending substantially to said intake end for moving containers in single file away from the disc, the combination of: arcuate peripheral guide rail means disposed over at least a portion of said disc circumferentially on the near side of said conveyor intake reckoned with respect to the direction of rotation of the disc and interrupted at said intake; and a take-off guide extending from the far side of the conveyor intake inwardly over the disc and toward said near side to deflect said containers outwardly from said axis of rotation into the conveyor, said take-off guide having the upper margin thereof sloping downwardly from said far side of the conveyor intake toward the inner end of the guide, whereby said containers are first engaged by the guide at the lower portions thereof.

10. Apparatus according to claim 9 wherein said take-off guide includes a substantially horizontal member that is situated at a level near the disc and is curved concavely toward the said conveyor intake, and a second member that slopes downwardly from the far side of the conveyor intake and forms the said upper margin of the take-off guide.

11. In a container-handling apparatus comprising a horizontal disc mounted for rotation on a vertical axis and adapted to support cylindrical containers in upright position and a conveyor having the intake thereof positioned to receive said containers in upright position from a peripheral portion of said disc and having lateral guides and a power driven means extending substantially to said intake end for moving containers in a single file away from the disc, the combination of: arcuate peripheral guide rail means disposed over at least a portion of said disc circumferentially on the near side of said conveyor intake reckoned with respect to the direction of rotation of the disc and interrupted at said intake; a take-off guide extending from the far side of the conveyor intake over the disc inwardly to deflect said containers outwardly from said axis of rotation into the conveyor; and a discharge brake at said intake of the conveyor for impeding the movement of said containers in the conveyor, said brake being adapted to retain at least one container at said intake for engagement by the next container deflected into the intake.

12. In combination with the apparatus according to claim 11, a sensing member situated over the disc on the far side of said conveyor intake to be engaged by containers thereon and movable outwardly from said axis of rotation by the force of containers that are carried by the disc beyond said take-off guide; and a connection for releasing said discharge brake to permit unimpeded movement of containers through said conveyor upon an outward movement of the sensing member.

13. Apparatus for merging a plurality of separate single files of containers to form a single file of containers comprising: a horizontal disc mounted for rotary movement about a vertical axis; a plurality of supply conveyors disposed for feeding the respective files of containers onto the disc at circumferentially displaced points thereof, each of said conveyors including lateral guides for retaining said containers as a single file and at least one of said supply conveyors having power-driven means for advancing the containers therein; a deflector guide disposed over the disc extending inwardly from a point intermediate the said supply conveyors for deflecting containers fed from the first conveyor, that is ahead of the deflector reckoned with respect to the direction or rotation of the disc, to a radially inner part of the disc; a discharge conveyor disposed for receiving containers in a single file from a radially outer part of said disc; an arcuate peripheral guide disposed to retain containers on the disc between said conveyors; a take-off guide extending from the circumferentially far side of the discharge conveyor over the disc inwardly to deflect said containers outwardly from said axis of rotation into the discharge conveyor; a laterally movable brake on said powered conveyor adapted when operated to impede the movement of containers from said powered conveyor onto the disc; an arcuate sensing arm pivotally mounted over the disc about a vertical axis for movement toward and away from said axis of rotation and positioned behind the discharge conveyor to be engaged by containers on the disc carried beyond said take-off deflector, said arm being connected to said brake to operate the brake upon outward movement of the arm; and resilient means urging said arm inwardly.

14. Apparatus according to claim 13 wherein the part of said arm nearest the said one supply conveyor that is ahead of the deflector is situated closer to the said axis of rotation than the radially innermost part of said deflector, whereby containers on said disc that are carried by the disc away from the arm will move substantially along an arc situated radially inwardly from containers fed from the said one conveyor.

15. Apparatus according to claim 14 wherein said deflector is curved toward the said direction of rotation of the disc, whereby containers fed from the said other of said supply conveyors are deflected for movement adjacent to said peripheral guide and radially outwardly from the containers fed from said one conveyor.

16. In combination with the apparatus according to claim 13, a peripheral guide situated ahead of said one supply conveyor and inclined inwardly toward the said axis of rotation in the said direction of rotation to deflect containers that are carried by the disc toward said one supply conveyor radially inwardly for movement substantially along an arc situated radially inwardly from containers fed from the said one conveyor.

References Cited in the file of this patent
UNITED STATES PATENTS

| | | |
|---|---|---|
| 961,193 | Wood | June 14, 1910 |
| 2,558,751 | Hebert | July 3, 1951 |
| 2,642,173 | Wehmiller | June 16, 1953 |